UNITED STATES PATENT OFFICE.

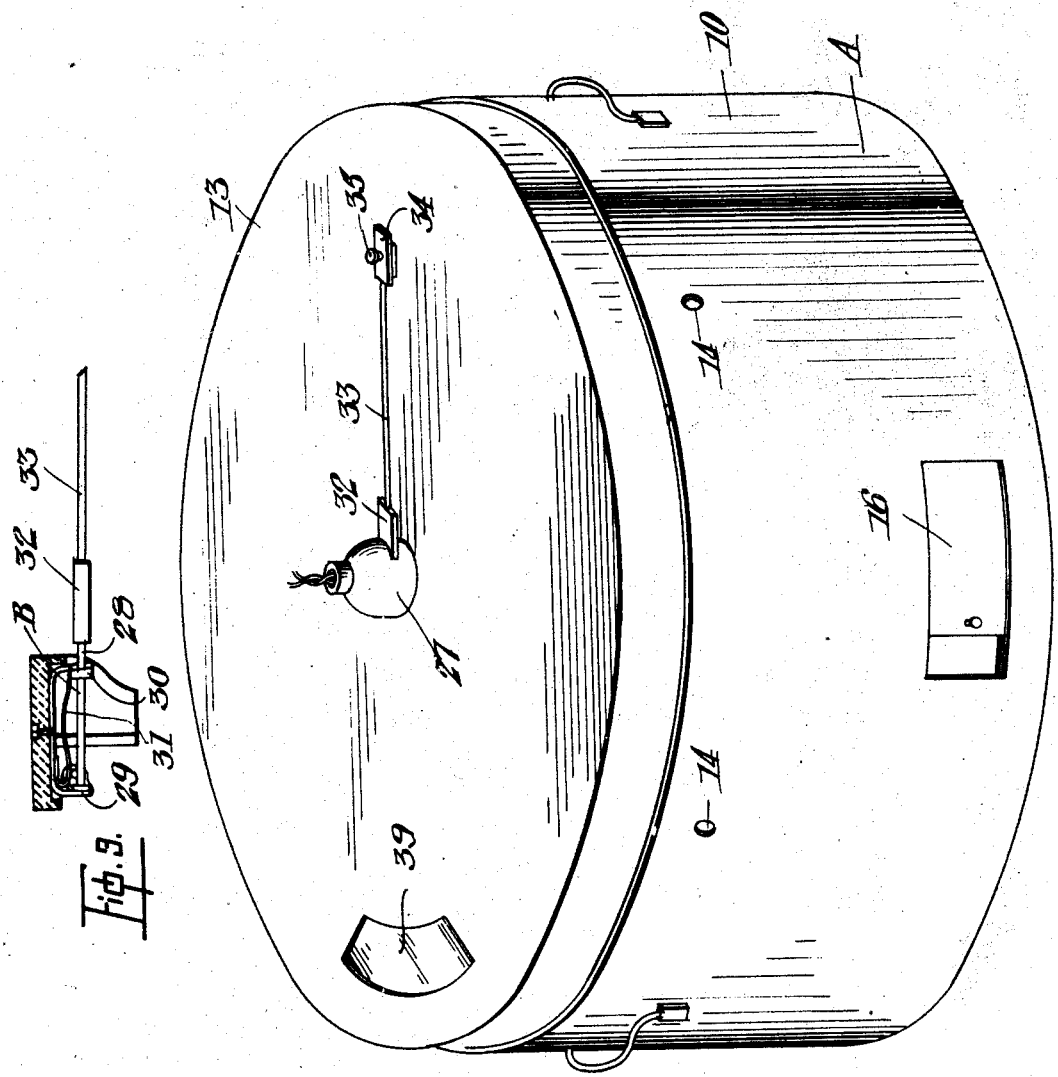

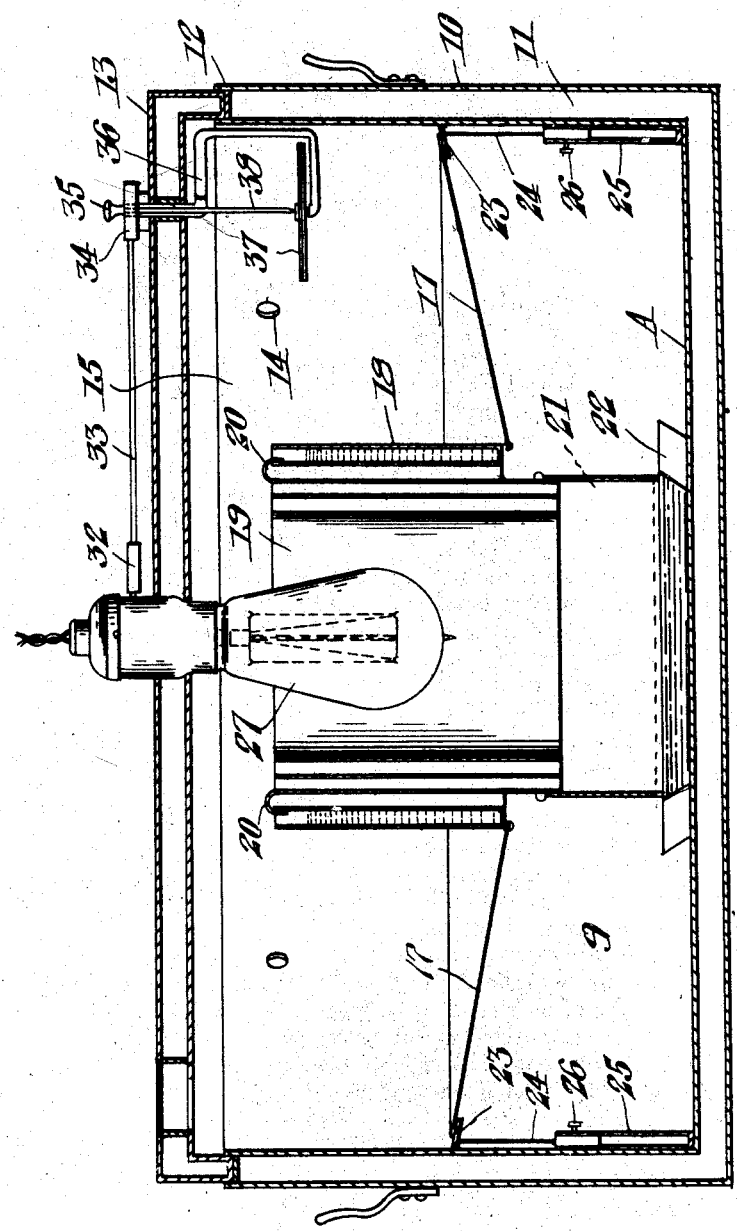

FRANCIS GIDDENS, OF OTTAWA, ONTARIO, CANADA.

INCUBATOR.

1,345,593.   Specification of Letters Patent.   Patented July 6, 1920.

Application filed May 31, 1918. Serial No. 237,517.

*To all whom it may concern:*

Be it known that I, FRANCIS GIDDENS, subject of the King of Great Britain, and resident of the city of Ottawa, in the Province of Ontario, Dominion of Canada, have invented certain new and useful Improvements in Incubators, of which the following is a specification.

This invention relates to improvements in incubators and the paramount objects of the invention are to give the desired humidity to the air heated in the machine and to facilitate adjusting the height of the tray whereby the temperature of the eggs located at different parts of the tray will be kept practically uniform.

With the above and other objects in view the invention consists essentially of the improved construction particularly described and set forth in the following specification and accompanying drawings forming part of the same.

In the drawings,

Figure 1 is a perspective view of the improved incubator.

Fig. 2 is a longitudinal section of the same.

Fig. 3 is an enlarged fragmentary sectional elevation of the lamp switch.

Like characters of reference refer to like parts in the several figures.

Referring to the drawings A represents the improved incubator comprising a casing 10 formed with hollow side walls and bottom, thereby providing a space 11, which may be filled with any suitable heat nonconducting material to prevent dissipation of the heat by radiation.

The top of the side wall of the casing is provided with an annular groove 12 extending therearound with which the downwardly disposed flange of the hollow cover 13 is adapted to engage. The cover may also be filled with a heat nonconducting material.

The casing 10 is provided intermediate of its height with a plurality of ventilating orifices 14, which extend into the egg chamber 15, while in the lower portion, or nursery 9, of the casing, a door 16 is slidably mounted, so that it can be opened to any desired extent to control the flow of air entering the incubator.

The casing 10 is divided into two compartments by the egg tray 17 which is dished toward the center, and is rigidly attached to a reservoir 18 designed to be filled with water or other liquid from which the air passing through the incubator takes up a certain amount of moisture.

This reservoir 18 is formed cylindrical, and in the embodiment illustrated supports a plurality of removable spaced cylinders 19, the outermost of which is provided with fingers 20 adapted to be bent over the inner upper edge of the reservoir 18, which thus holds the cylinders 19 in position.

The cylinders 19 are concentrically arranged and normally extend slightly below the bottom of the egg tray 17, and from one or more of the cylinders, wicks 21 depend and extend into and take up moisture from the water pan 22, so that as the air passes through the wicks 21 to circulate through the cylinders 19, it takes up a certain amount of moisture and becomes humidified.

The outer edge of the tray 17 rests on a ring 23 from the lower face of which a plurality of downwardly extending rods 24 extend, and these rods are slidably mounted in guides 25 through which set screws 26 are threaded to frictionally engage the rods and hold them in the desired position.

It will be clear that by loosening the set screw 26, the ring 23 and consequently the egg tray 17 can be elevated or lowered when found necessary. Instead of using the set screw 26 to secure the rods 24 in position any other means may be employed whereby an adjustment of the ring 23 and tray 17 can be accomplished.

The heat for the incubator is provided by an ordinary electric lamp 27, or heating element, which is concentrically located in the cylinders 19, and this lamp is controlled by a suitable switch B, whereby the current may be cut off or supplied to the lamp to maintain the temperature of the incubator at the desired height.

This switch B comprises a lever 28 rigidly connected at one end to the terminal 29 provided intermediate of its length with a contact block 30 adapted to engage with a spring 31 whereby the contact block is pressed down to engage with one of the terminals of the lamp 27.

On the end of this lever 28 an electric nonconducting coupling 32 is mounted to which the rod 33 is attached, the outer end of the rod engaging with the block 34 through which the adjusting screw 35 of the thermostatic element is threaded.

The thermostatic element comprises a frame 36 having a lower offset end, and the wafer or thermostatic element 37 is supported between the lower arm of the frame 26 and the point of the spindle 38 which is slidably mounted at the upper end in the said frame.

The spindle coacts with the screw 35, so that, on movement of the wafer 37, motion will be transmitted to the spindle 38 which will coact with the screw 35 and so move the rod upwardly and thus move the lever 28, and so disengage the contact block 30 from the terminal of the lamp and in this way break the electric circuit. When the rod 33 returns to its normal position the circuit is again closed.

The cover 13 is provided with an inspection panel 39 of any suitable transparent material whereby the incubator can be readily inspected from the outside.

When the machine is being used for hatching purposes the cover 13 is removed and eggs are placed upon the tray 17, which is adjusted to the desired level to give good results.

The reservoir 18 is now filled with water or other liquid, as also is the pan 22, and the cover 13 is then replaced.

When the electric circuit is closed the desired amount of heat for the incubator is derived from the lamp 27.

The door 16 it will be understood is opened to the desired extent to permit of air entering the incubator, and this air will pass upwardly through the passageways formed between adjacent cylinders 19 and through the center cylinder. The air which passes between the outermost cylinders 19 and the reservoir 18 is comparatively dry, while that which passes through the moistened wicks 21 will take up moisture to give the proper humidity to the air.

The air on its passage through the cylinders 19 will be heated, and if any more moisture is required this will be taken up from the reservoir 18.

After leaving the cylinders 19 the air will be deflected and pass to the outer side of the tray 17 and will then move toward the center, so that all the eggs will be uniformly heated.

Should the temperature rise beyond the desired height the switch B will cut off the current from the lamp 27 until the temperature in the incubator reaches the proper level, when the current will be again turned on and the lamp lighted. It will thus be clear that an automatic regulation of the temperature is obtained.

When turning the eggs, the inner row adjacent to the reservoir 18 is moved to the outward edge of the tray 17, so that the other rows of eggs roll downwardly toward the reservoir and are thus quickly turned, all that it is necessary to do being to shift the lower or innermost row as above described and turn it during the operation of moving the eggs to the outer side of the tray 17. The position of the eggs on the tray 17 will thus be changed each time the eggs are turned.

When the eggs are hatched the tray 17 may be removed and the chicks placed in the lower compartment or nursery 9 of the incubator, and the lamp 27 may still be retained in the incubator which now forms a heated hover.

The casing 10 may be constructed of any suitable material and provided with handles if such are found desirable for the ready moving of the machine.

As many changes could be made in the above construction and many apparently widely different embodiments of my invention within the scope of the claims, constructed, it is intended that all matter contained in the accompanying specification and drawings shall be interpreted as illustrative and not in a limiting sense.

What I claim as my invention is:

1. In a machine of the class described, an egg tray dished toward the center, a cylindrical reservoir extending upwardly from the tray and rigidly attached thereto, a removable cylinder arranged in the reservoir and spaced from the inner wall thereof, a pan positioned below said cylinder, an air moistening wick depending from the cylinder and extending into the pan, and heating means in the cylinder.

2. In a machine of the class described, an egg tray dished toward the center, a cylindrical reservoir extending upwardly from the tray and rigidly attached thereto, a plurality of spaced cylinders removably located in the reservoir and spaced therefrom and having their lower ends normally extending below the lower end of the reservoir, a pan positioned below said cylinders, an air moistening wick depending from one of the cylinders and extending into the pan, and heating means within the cylinder.

3. In a machine of the class described, an egg tray dished toward the center, a cylindrical reservoir extending upwardly from the tray and rigidly attached thereto, a removable cylinder arranged in the reservoir, arms carried by the cylinder for securing the same to the reservoir, a pan positioned below said cylinder, an air moistening wick depending from the cylinder and extending into the pan, and heating means in the cylinder.

4. In a machine of the class described, an egg tray dished toward the center, a ring supporting the egg tray, means for adjusting the ring in a vertical direction, a reservoir extending upwardly from the tray and rigidly attached thereto, a removable cylinder embraced by the reservoir, and a heating means within the cylinder.

In witness whereof I have hereunto set my hand in the presence of a witness.

FRANCIS GIDDENS.

Witness:
    JAMES MITCHELL.